United States Patent [19]

Cohen et al.

[11] Patent Number: 5,248,118
[45] Date of Patent: Sep. 28, 1993

[54] SPACECRAFT ATTITUDE CONTROL SYSTEM WITH REACTION WHEEL BEARING PROTECTION

[75] Inventors: Walter J. Cohen, Hightstown; Neil E. Goodzeit, East Windsor; Michael A. Paluszek, Lawrenceville, all of N.J.

[73] Assignee: General Electric Co., East Windsor, N.J.

[21] Appl. No.: 882,507

[22] Filed: May 13, 1992

[51] Int. Cl.$^5$ .............................................. B64G 1/24
[52] U.S. Cl. .................................. 244/164; 244/165; 244/166
[58] Field of Search .............. 246/164, 165, 166, 167, 246/169, 170

[56] References Cited

U.S. PATENT DOCUMENTS

| | | | |
|---|---|---|---|
| 4,010,921 | 3/1977 | Pistiner et al. | 244/166 |
| 5,020,745 | 6/1991 | Stetson, Jr. | 244/165 |
| 5,058,835 | 10/1991 | Goodzeit et al. | 244/165 |
| 5,123,617 | 6/1992 | Linder | 244/166 |
| 5,149,022 | 9/1922 | Flament | 244/164 |
| 5,201,833 | 4/1993 | Goodzeit et al. | 244/165 |

Primary Examiner—Galen Barefoot
Attorney, Agent, or Firm—W. H. Meise; C. A. Berard; S. A. Young

[57] ABSTRACT

A spacecraft includes an attitude control system using one or more reaction wheels, the speed of which from time to time lie near and pass through zero angular velocity. When operated for extended periods of time at low speeds, the lubrication films are not distributed uniformly on the wheel bearings, leading to reduced lifetime. Reliability is maintained by a threshold comparator coupled to compare wheel speed with a lower limit value, for operating a torquer associated with the spacecraft body when the wheel speed drops below the lower limit, in a manner which tends to raise the wheel speed. In a particular embodiment of the invention, the lower limit is integrated with a wheel overspeed unloading.

13 Claims, 4 Drawing Sheets

SPACECRAFT ATTITUDE CONTROL SYSTEM WITH REACTION WHEEL BEARING PROTECTION

The Government has rights in this invention pursuant to Contract No. F04701-89-C-0073 with the Air Force.

BACKGROUND OF THE INVENTION

This invention relates to spacecraft attitude control systems and, more particularly, to such attitude control systems using reaction wheel assemblies.

Spacecraft control may relate to the location of the spacecraft, also known as stationkeeping in the case of a geosynchronous spacecraft, and also includes attitude control, which establishes the orientation of the various faces of the spacecraft relative to some other body. Control of the location of the spacecraft requires accelerating the spacecraft as a whole in some desired direction, which is performed by ejecting matter in the opposite direction by the use of thrusters. Attitude control involves the application of torques to the spacecraft for proper orientation.

Torques may be applied to a spacecraft by ejecting matter from thrusters at diverse locations on the spacecraft so as to create torques. This may be accomplished, for example, by propellant or monopropellant chemical thrusters, with or without electrical augmentation. Such thrusters have the major disadvantage that the supply of ejectable matter or propellant may become depleted, thereby terminating the ability to perform attitude control maneuvers. Chemical thrusters also have the disadvantage that they are difficult to modulate to perform fine attitude control maneuvers. Another method for torquing spacecraft for attitude control involves the use of magnetic coils associated with the spacecraft, which when energized create magnetic fields which interact with the geomagnetic field of the earth to generate torques. Magnetic torquers have the advantage of being energized by electricity, which on a spacecraft equipped with solar panels is a renewable resource. However, magnetic torquing has the disadvantage that the torquing is dependent not only on the current flowing through the coils, but also upon the earth's magnetic field, which varies from place to place and from time to time, which makes accurate control difficult. Also, magnetic torquing provides relatively modest levels of torque which are not suitable for rapid slewing, such as may be required for repositioning antennas or sensors, or for recovering from transient disturbances.

Torquing of the spacecraft may also be provided by reaction wheels or momentum wheels, the inertia of which reacts to provide body torque when the wheel is accelerated. In general, "reaction" wheels provide torques by accelerations which cause the wheel to spin in either direction, passing through zero angular velocity at some times, whereas momentum wheels are "biased" to a relatively high angular velocity, and are accelerated and decelerated, as required, while maintaining rotation in a single direction. Such wheels have the advantages of precise control and electrical operation. In order to have significant torquing effect, the wheel must have significant mass, significant size, or be capable of high angular velocities. Because of weight constraints on the spacecraft, it is desirable to minimize the mass of the wheel. Reductions in the mass or in the wheel diameter decrease the inertia, and increase the angular velocities required for proper spacecraft torquing. Compromises must be made among the various parameters, depending upon the spacecraft mission. As between momentum wheels and reaction wheels, the reaction wheel is subject to attitude errors due to bearing friction effects which occur at and near zero angular velocity, as described in U.S. Pat. No. 5,020,745, issued Jun. 4, 1991 in the name of Stetson, Jr. Various schemes have been devised for correcting for the effects of friction in a reaction wheel, as for example that described in copending application, Ser. No. 07/732,963, filed Jul. 19, 1991 in the name of Goodzeit et al, now U.S. Pat. No. 5,201,833. The momentum wheel has the advantage that the wheel bearings tend to be more reliable than the bearings in a reaction wheel, which is believed to result from maintenance of a continuous film of lubricant on the bearing surfaces by the rapid motion of the bearing. The momentum wheel also avoids the problem of low speed bearing friction by biasing the wheel speed so that the wheel never reaches zero angular velocity. However, this reduces the potential range of control by comparison with that of the reaction, because the reaction wheel may be accelerated to both positive and negative angular velocities, whereas the momentum wheel cannot have both positive and negative velocities.

When reaction or momentum wheels are used for attitude control, it is found that the control requirements may result in a continuous average secular increase or decrease in the velocity of a wheel. This is most easily understood by considering a geosynchronous, earth-facing communications satellite, which must make one complete rotation every 24 hours, as its orbit takes it around the earth, in order to maintain a face directed toward earth. The torque required to provide this slow continuous rotation of the spacecraft body is provided by a continuous acceleration or deceleration of a wheel whose axis is perpendicular to the orbital plane. The wheel speed cannot continue to increase indefinitely, because centrifugal effects would result in disintegration. In the case of a momentum wheel, its speed cannot be permitted to decrease to zero angular velocity. As a result, a procedure known as "unloading" of the wheel is applied by which thrusters or magnetic torquers are energized for relatively short periods to generate torques which, when applied to the spacecraft body, allow the wheel speed to be returned to a nominal value. Such a scheme using magnetic torquers is described, for example, in allowed application Ser. No. 07/488,919, filed Mar. 5, 1990 in the name of Linder et al, now U.S. Pat. No. 5,123,617.

The very large capital cost of satellites and of placing satellites into orbit requires that the expected lifetime of the spacecraft be extended as much as possible so as to achieve a suitable economic return during its operating life. For this purpose, the spacecraft mass is minimized, so the maximum amount of expendable propellant for the thrusters can be carried into orbit, and various redundancy schemes are provided, both in the spacecraft and in its payload, to insure that a single failure does not result in failure of the mission. Among these redundancy schemes is the use of a number of reaction or momentum wheels which exceeds the minimum number required for control of the spacecraft attitude. For example, in a three-axis stabilized spacecraft, the minimum number of wheels required for three-axis control is three, one along each axis of control. However, to take into account the possibility of failure of a single wheel, four or more wheels with mutually skewed axes may be provided. While such a scheme provides redundancy, it substantially increases the complexity of the control system, in that controlled acceleration of any one wheel results in torques of the spacecraft body about two or more principal axes. Also, when four or more wheels are used for three-axis control, the amount of electrical energy applied to the wheels may exceed the minimum required for control. A scheme for controlling the wheel speeds in a system including four or more wheels for minimizing the power is described in U.S. Pat. No. 5,058,835, issued Oct. 22, 1991 in the name of Goodzeit et al.

SUMMARY OF THE INVENTION

A spacecraft attitude control system according to the invention includes a reaction wheel providing torque about at least one axis under the control of a wheel torque command signal. A signal representative of the wheel speed is compared with at least one threshold, to indicate whether the speed is in a regime in which a lubricant film is maintained, or whether the speed has dropped to a level at which the lubrication may not be effective. If the wheel speed is high, the conventional attitude control system which produces the wheel torque command signal continues to operate in a conventional manner. When the wheel speed drops below the threshold level, a torquer associated with the spacecraft body is energized to provide a torque which allows the wheel speed to be increased to a level greater than the threshold level. In a particular embodiment of the invention, a signal representative of the magnetic torque is subtracted from the wheel control signal to modify the wheel torque command, to thereby reduce the attitude error as the wheel is accelerated. In another embodiment of the invention, the torquer is a magnetic torquer, and the local geomagnetic field is sensed or obtained from a magnetic field model.

DESCRIPTION OF THE INVENTION

Figure 1:
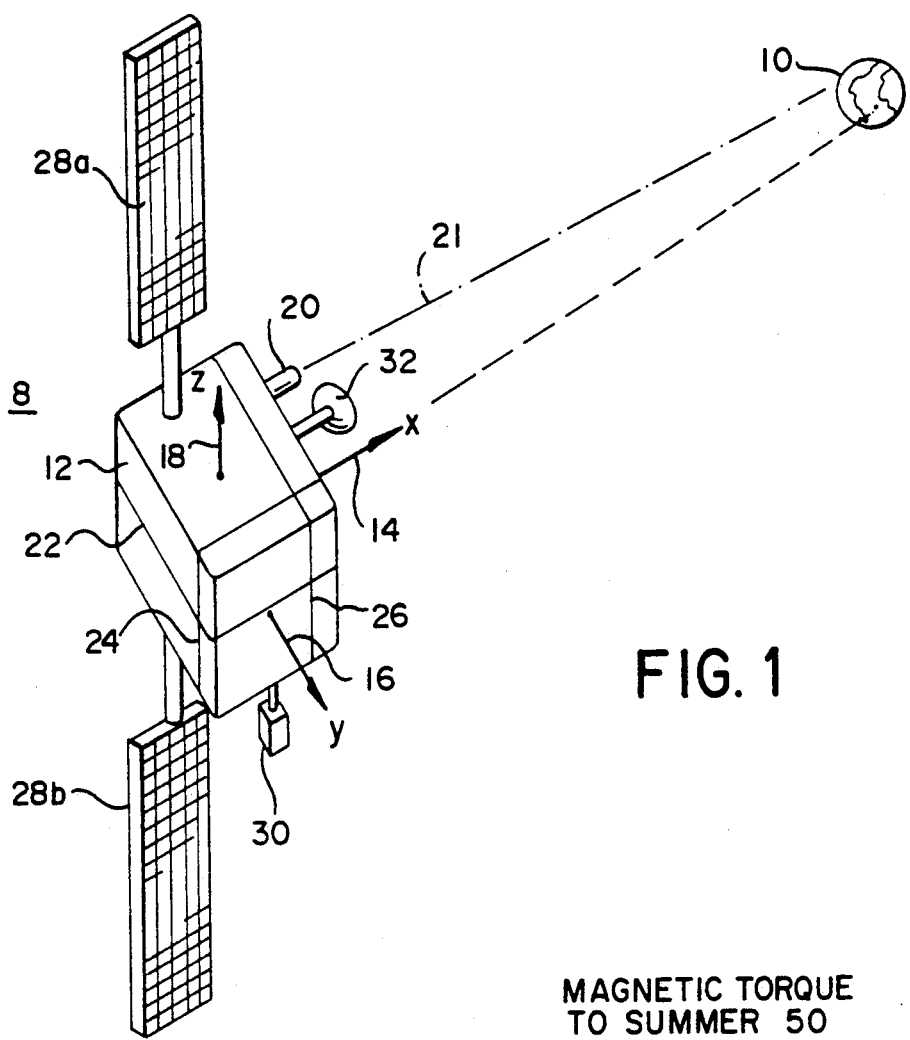
FIG. 1 is a simplified perspective or isometric view of a spacecraft orbiting a heavenly body.

In FIG. 1, a spacecraft, designated generally as 8, orbits about a heavenly body 10, such as earth. Spacecraft 8 includes a body 12 and associated x, y and z axes 14, 16 and 18, respectively. The x and y axes lie in the orbital plane, with the x axis directed toward body 10, and the z axis is normal to the orbital plane. An earth sensor illustrated as 20, having a line-of-sight 21 which is generally parallel to the x axis, provides information relative to spacecraft roll (rotation about the y axis) and pitch (rotation about the z axis). Three sets of mutually orthogonal torquing coils 22, 24 and 26 are mounted on spacecraft body 12. Electrical power for earth sensing arrangement 20, coils 22, 24 and 26, and other electrical equipments associated with spacecraft 8 and its payload, is provided by a pair of solar panels illustrated as 28a and 28b. A magnetometer 30 is associated with spacecraft 8 for sensing local magnetic fields, and a payload, illustrated in part by a directional antenna 32, is carried by the spacecraft. While not expressly illustrated, spacecraft 8 includes at least one reaction wheel.

Figure 2:
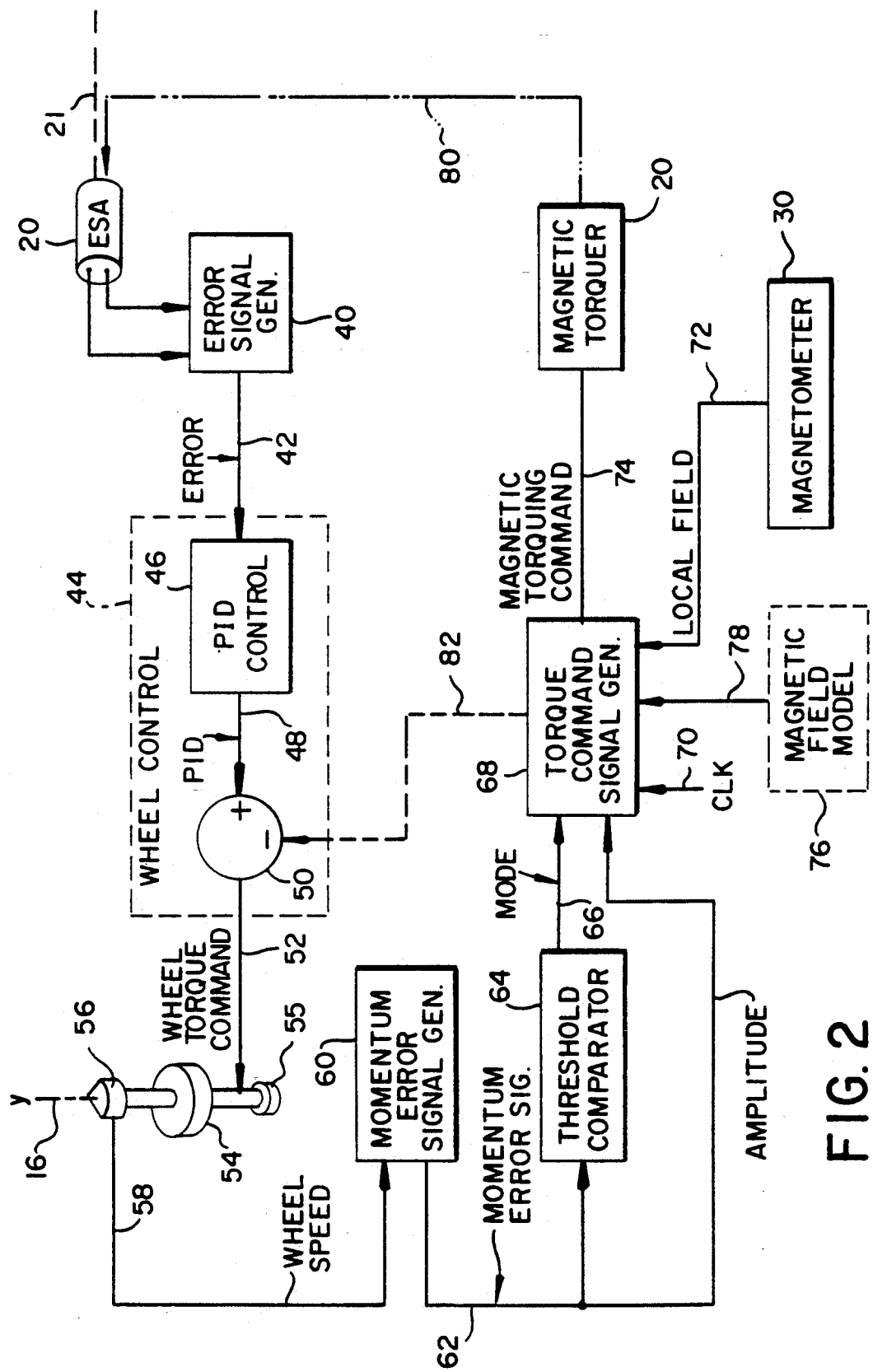
FIG. 2 is a simplified block diagram of one axis of attitude controller according to the invention which may be used in the spacecraft of FIG. 1.

FIG. 2 is a simplified block diagram of a single-axis attitude control system according to the invention, which may be used for controlling the attitude of spacecraft 8 of FIG. 1 about one axis. In FIG. 2, elements corresponding to those of FIG. 1 are designated by like reference numerals. In FIG. 2, earth sensing assembly (ESA) 20 produces signals representative of the upper and lower horizon of the earth as seen from the spacecraft, which are applied to an error signal generating arrangement illustrated as a block 40. A description of such an ESA appears in U.S. Pat. No. 5,107,434, issued Apr. 21, 1992 in the name of Paluszek. Error signal generator 40 determines if the horizon signals are centered around boresight axis 21 associated with ESA 20, and produces an error signal on a datapath 42 for application to a wheel controller illustrated as a block 44. Wheel controller 44, as illustrated in FIG. 2, includes a proportional-integral-derivative (PID) control circuit 46, which receives the error signal, and which in known fashion produces on a data path 48 a control signal including proportional, integral and derivative components. The PID signals on data path 48 are applied to the non-inverting (+) input port of a summing circuit 50. In the absence of a signal applied to the inverting (−) input port of summing circuit 50 (or more properly, when the signal is zero), the PID signal passes unchanged through summing circuit 50 and appears as a wheel torque command signal on a data path 52 for application to control a reaction wheel illustrated as 54. Reaction wheel 54 is located within body 12 and is supported by one or more bearings 55, with its axis at least parallel to y axis 16. Acceleration or deceleration of wheel 54 therefore results in a torque about the y axis, which is a roll torque.

When the angular velocity or speed of reaction wheel 54 is maintained at low values for long periods of time, the lubricant film (not illustrated) associated with wheel bearing 55 tends to break down or at least may not be distributed over the bearing surface in a uniform manner, which results in increased wear with the consequent possibility of premature failure or increased friction, which in turn may result in attitude errors under some conditions. This is corrected, according to the invention, by a bearing protection system, which operates a body torquer to increase wheel speed, as described below. The bearing protection system maintains the wheel momentum, while the PID attitude control loop or system nulls attitude errors.

A wheel speed sensor or tachometer 56 of FIG. 2 is associated with reaction wheel 54, and produces wheel speed representative signals on a data path 58. The wheel speed information includes polarity or direction of rotation information. The wheel speed signals are applied to a momentum error signal generator 60, which converts the wheel speed into an equivalent momentum by multiplying the wheel speed by the estimated inertia of the wheel. The momentum error signal is termed an "error" because it is the difference between the total momentum (the sum of the spacecraft body momentum and the momentum of the reaction wheel about an axis) and the desired momentum level. Body momentum is the product of estimated body inertia about the axis, multiplied by estimated or measured body angular rate. Actual body rate may be derived from gyros or an earth sensor, and estimated body rate from an estimator. However derived, momentum error signal generator 60 produces the momentum error signal on a data path 62, from which it is applied to a threshold comparator 64 and to a torque command signal generator 68. Threshold comparator 64 compares the absolute momentum error signal applied from data path 62 with a lower threshold, which represents the minimum momentum or speed which the wheel is to have, and also compares the momentum with an upper value, representing the maximum permitted speed. Thus, the wheel speed may take on one of three different regimes or modes, with two polarities. For example, the wheel speed may be such that the absolute momentum lies below the lower threshold, lies between the upper and lower thresholds, or may exceed the upper threshold, and this may occur in either direction of rotation. The mode information is generated on a data path 66 for application to torque command signal generator 68.

Torque command signal generator 68 receives mode signals from data path 66 and momentum error signals (magnitude and polarity) from data path 62, and processes the signals. If the wheel momentum lies between the upper and lower thresholds, as indicated by the mode signal, torque command signal generator produces no magnetic torquing command, and no magnetic torque is produced. Thus, when the wheel speed is neither too high nor too low, no further action is taken, and conventional attitude control continues. When the wheel speed is above the upper threshold, indicating a need to reduce the wheel speed in an "unloading" manner, torque command signal generator 68 produces on data path 74 a magnetic torquing command signal for application to magnetic torquer 20, with a magnitude which is related to the magnitude of the momentum error signal, and preferably proportional thereto produced by block 60, and of a sense or polarity which results in a body torque which tends to reduce the speed of wheel 54.

In order for torque command signal generator 68 to command the desired amount of magnetic torque, it must have information indicative of the local geomagnetic field with which the magnetic field of torquer 20 will interact. For this purpose, magnetometer 30 produces on a data path 78 signals which represent the local geomagnetic field, and applies those signals over the data path to torque command signal generator 68. The availability of information about the local geomagnetic field allows the desired torque magnitude to be translated into the requisite average electrical current for application to magnetic torquer 20. This average current is often achieved by pulse duration modulation of a fixed-magnitude current. An alternative to the use of magnetometer 30 for directly sensing the geomagnetic field is to use a magnetic field model, illustrated as a block 76, to generate an estimate of the geomagnetic field, based upon the orbital position of the spacecraft.

In operation of the arrangement of FIGS. 2 as so far described, ESA 20 scans the horizons to produce signals, which taken into combination represent the roll attitude of the spacecraft. Error signal generator 40 interprets those signals to produce an error signal, which is processed by a control law in controller 46, for application to wheel 54. Wheel speed signals are applied to momentum error signal generator 60, which produces signals representative of amplitude and direction for application to threshold comparator 64 and torque command signal generator 68. Threshold comparator 64 compares the wheel speed or momentum with upper and lower thresholds of both polarities, to produce mode signals. Torque command signal generator 68 takes no action when the wheel speed represents a moderate momentum, and, when the wheel speed is above or below the thresholds, generates appropriate magnetic torque command signals for magnetic torquer 20, for torquing the spacecraft in a manner which changes the attitude sufficiently so that ESA 20, error signal generator 40, and controller 46 modify the wheel speed toward the desired range.

It should be noted that it is not necessary to perform the conversion of wheel speed into momentum error before performing the thresholding, but it is convenient to do so because momentum, rather than wheel speed, is being controlled.

As described above, the bearing protection system torques the spacecraft to maintain the reaction wheel speed within a range below saturation speed and above a speed selected to provide adequate lubrication to the bearings. It may be undesirable to cause even a small attitude error in order to maintain the wheel speed within the desired range. A feedforward signal representing the magnetic torque is produced by torque command signal generator 68 and applied over a data path illustrated by dash line 82 to the inverting input port of summing circuit 50. The signal representative of magnetic torque is subtracted in summer 50 from the PID signal produced by controller 46 on data path 48. In effect, a command signal is thereby applied to the wheel just as though the spacecraft attitude had been shifted, but without the actual shift taking place. Another way of looking at the magnetic torque signal applied over data path 82 is that it provides the PID loop with advance warning, so that it expects the application of the magnetic torques. With the arrangement of FIG. 2, including data path 82 and summing circuit 50, a signal is applied over data path 82 to summing circuit 50 when magnetic torquer 20 is turned on, which causes a change in the speed of wheel 54 which counteracts the torque provided by magnetic torquer 20. Thus, the wheel speed is brought closer to the nominal value, without attitude error. Of course, some residual attitude error may result if the estimated magnetic torque which is subtracted from the PID signal in summing circuit 50 does not correctly represent the actual magnetic torque, but this residual error is corrected by the PID control channel.

Figure 3:
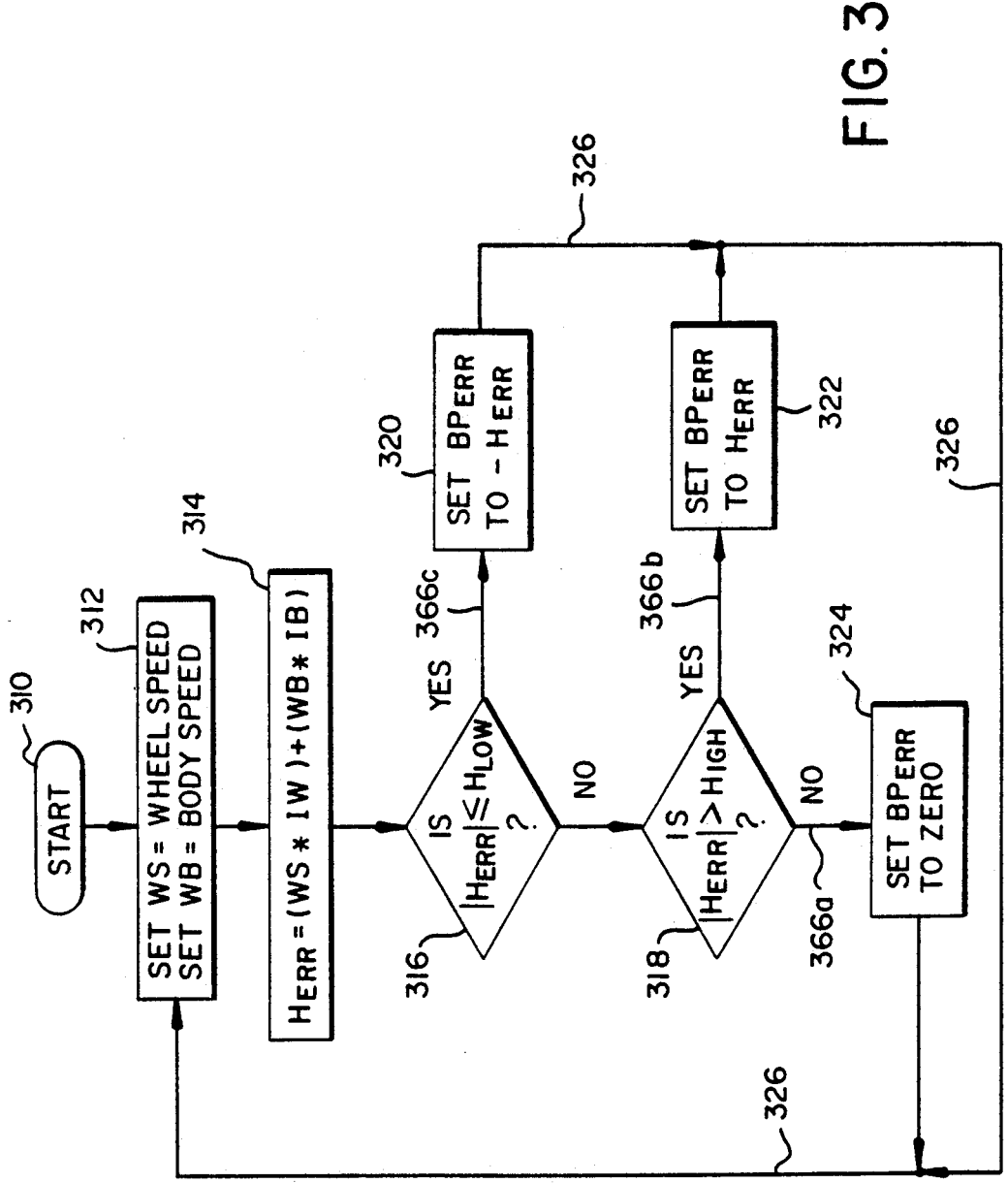
FIG. 3 is a simplified flow chart of the logic flow in portions of arrangement of FIG. 2.

FIG. 3 is a simplified flow chart illustrating logic for performing the threshold comparison and for determining the bearing protection error signal $BP_{ERR}$. In FIG. 3, the logic begins at a start block 310 and proceeds to a block 312, in which a wheel speed variable WS is set equal to the current wheel speed, and the body speed variable WB is set equal to the current body angular velocity. The logic flows to a block 314, in which the total momentum error $H_{ERR}$ is determined by summing the wheel and body momentum, where the wheel momentum is determined by multiplying WS by the wheel inertia $I_w$ and the body momentum is the product of WB multiplied by body inertia IB. The logic then flow to a decision block 316, which determines if the absolute magnitude of $H_{ERR}$ is less than a lower threshold $H_{LOW}$. If the absolute magnitude of the momentum error signal is greater than the threshold, the wheel speed is deemed to be sufficient to maintain lubrication and no action is required, whereupon the logic flows by the NO output of decision block 316 to a further decision block 318, in which the absolute magnitude of $H_{ERR}$ is compared with an upper threshold value. If the wheel speed is below a level which is considered a high limit value, the logic exits decision block 318 by the NO output, and proceeds by a logic path 366a to a logic block 324, in which the current value of the bearing protection or mode signal $BP_{ERR}$ is set equal to zero. The logic then returns by a logic path 326 to block 312, and the procedure is repeated.

In the event that the wheel speed is above the desired maximum wheel speed, the logic exits from decision block 318 of FIG. 3 by the YES output and proceeds by way of a logic path 366b to a logic block 322, which represents the setting of bearing protection error signal $BP_{ERR}$ to the current magnitude of $H_{ERR}$ as determined in block 314. The logic then flows from block 322 onto path 326 and returns to block 312. It should be noted that when the current value of $BP_{ERR}$ is set in block 322, the magnitude of $BP_{ERR}$ will be near the maximum possible value, since it represents the momentum at a wheel speed in excess of the desired maximum wheel speed. Since the magnitude of $BP_{ERR}$ is later used to establish the magnitude of the correcting torque, the correcting torque will be at or near a maximum.

In the event that the wheel speed is below the minimum speed at which proper lubrication film is maintained in the bearings, the logic flow in the logic diagram of FIG. 3a exits block 316 by the YES path and a logic path 366c, and arrives at a block 320. Block 320 represents the setting of variable $BP_{ERR}$ to equal the negative of $H_{ERR}$ ($-H_{ERR}$), and the logic then returns to block 312 by way of block 326. It should be noted that, when the wheel speed is near zero, $BP_{ERR}$ will be near zero. This will result in application of extremely small values of torque to the body of the spacecraft, with resultant slow correction of the wheel speed toward the minimum speed. Logic paths 366a, 366b and 366c of FIG. 3 may together be considered to correspond to path 66 of FIG. 2, and the logic flow in one of the three paths 366 corresponds to the state of the mode signal.

Figure 4:
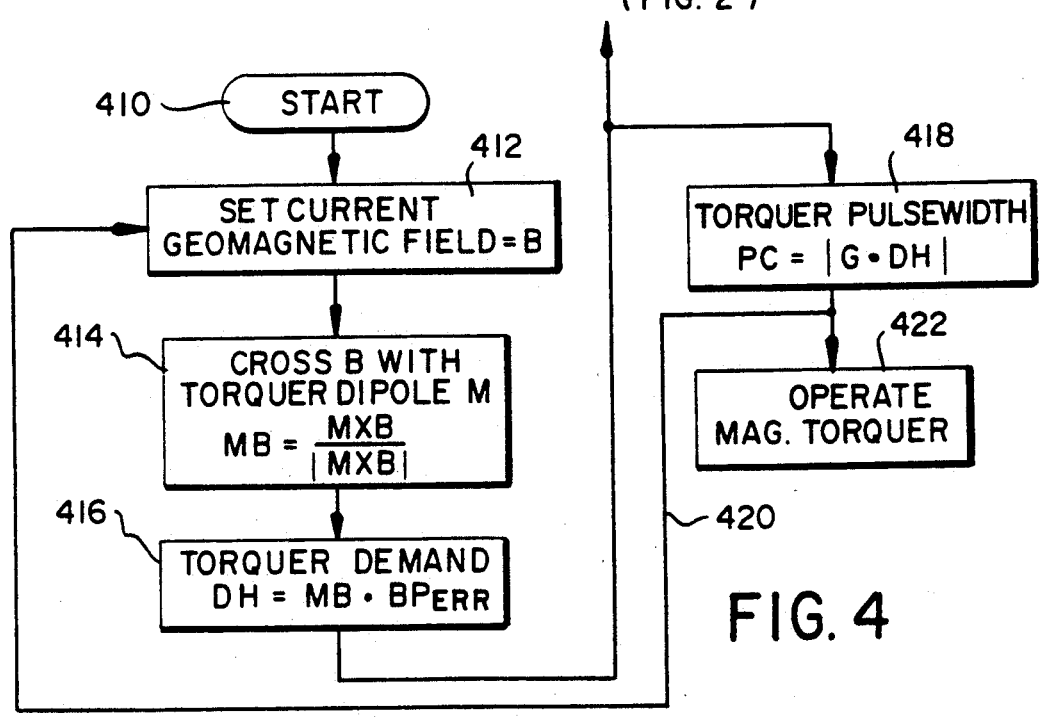
FIG. 4 is a simplified flow chart of the logic flow on another portion of the arrangement of FIG. 2.

FIG. 4 is a simplified flow chart illustrating the logic flow associated with torque command signal generator 68 of FIG. 2. In FIG. 4, the logic begins at a start block 410, and proceeds to a block 412, which represents the setting of a variable B equal to the current geomagnetic field, as established by magnetometer 30 or magnetic field models 76 of FIG. 2. From block 412 of FIG. 4, the logic flows to a block 414, which represents taking of the cross product of B with the magnetic torquer dipole M, and dividing by the magnitude of BXM, to produce the unitized magnetic torque MB. Block 416 represents determining the magnetic torquer demand DH as the dot product of the unitized magnetic torque multiplied by the current value of bearing protection error signal $BP_{ERR}$. Block 418 represents the determination of the duty cycle or pulse width of the ON times during which the magnetic torquer or coil 20 of FIG. 2 will be energized with a standard current. The pulse width PC is the absolute value of the product of torquer demand DH multiplied by a proportional gain G, which represents the translation between pulse width and the resulting current, which may depend upon coil temperature, system battery voltage, and the like. From logic block 418, the logic flows to a block 422, representing the operation of the magnetic torquer, and also flows back to block 412 by way of a logic path 420, to create a closed loop for continuous control of the operation of the magnetic torquer. It should be noted that, during those periods in which $BP_{ERR}$ is set to zero, the torquer demand established in block 416 of FIG. 4 will equal zero, and the corresponding pulse width PC determined by block 418 will also be zero, with the result that no magnetic torquer current will flow.

Figure 5A:
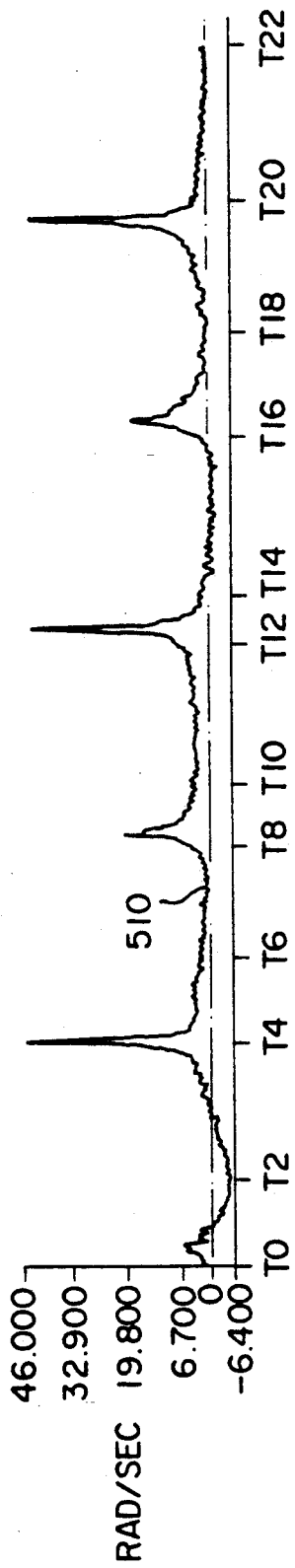
FIGS. 5a and 5b are plots of simulations of reaction wheel angular rate for an attitude control system with and without the invention, respectively.
Figure 5B:
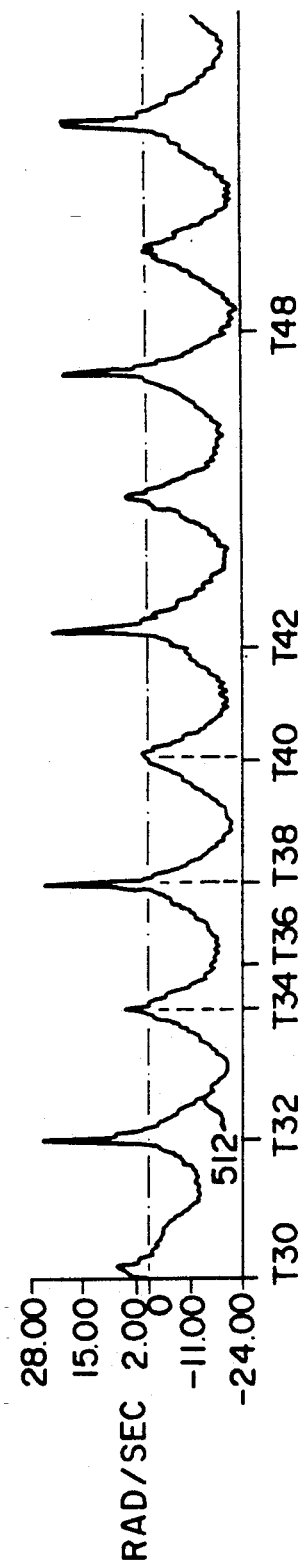

FIG. 5a represents a plot of reaction wheel angular velocity versus time for a simulated system as in FIG. 2, but without the reaction wheel bearing protection system, while FIG. 5b represents the results for a simulation of the complete system of FIG. 2, with the FIG. 3a variant. In FIG. 5a, plot 510 dwells for the most part in a range lying between ±6.5 radians per second, with extended periods, such as the region between times T6 and T8, T10 through T12, and T14 through T16 which are near zero angular velocity. By contrast, the simulation plot 512 of FIG. 5b has only occasional excursions near zero angular velocity.

Other embodiments of the invention will be apparent to those skilled in the art. For example, while magnetic torquers have been described for providing the body torques, other torquing arrangements, such as chemical thrusters, could be used. The invention may be used for spacecraft in orbits other than geosynchronous. While the magnetic field sensing arrangement is desirable, it is not absolutely necessary. The controller may use control laws other than PID, as for example PI.

What is claimed is:

1. A spacecraft attitude control system, comprising:
   a spacecraft body;
   torquing means coupled to said body for torquing said body under the control of a body torque command signal;
   reaction wheel means coupled to said body, for being rotated about an axis for torquing said body under the control of a wheel torque command signal, said reaction wheel means desirably being operated above a minimum angular velocity to maintain proper bearing lubrication;
   reaction wheel speed sensing means coupled to said reaction wheel means, for generating speed signals in response to the speed of said reaction wheel;
   sensing means coupled to said body for determining the sensed attitude of said spacecraft about said axis;
   error signal generating means coupled to said sensing means, for comparing said sensed attitude with a desired attitude, and for generating an error signal in response to the difference thereto;
   wheel control means coupled to said error sensing means and to said reaction wheel means for processing said error signal for generating said wheel torque command signal and for coupling said wheel torque command signal to said reaction wheel means;
   threshold comparison means coupled to said speed sensing means, for comparing said speed signals with at least one limit value, for generating comparison signals representative of at least the state of said speed signals relative to said limit; and
   torquing command signal generating means coupled to said threshold comparison means and to said torquing means for generating said body torque command signal in response to said comparison signals, for generating a body torque tending to cause said reaction wheel means to maintain a high speed regime.

2. A system in accordance with claim 1 wherein;
said torquing means comprises magnetic torquing means.

3. A system in accordance with claim 2, further comprising:
local magnetic determination means for generating signals representative of the local magnetic field;
wherein said magnetic torquing means comprises a plurality of mutually skewed magnetic torquers (22, 24, 26), and wherein said torquing command signal generating means comprises:
magnetic torquer distribution means coupled to each of said skewed torquers and to said local magnetic determination means, for allocating the torque demanded by said torquing command signal among said torquers.

4. A system according to claim 1 wherein said sensing means comprises earth sensing means.

5. A system according to claim 1 wherein said wheel control means further comprises:
control law processing means including at least proportional and integral components, coupled to said error signal generating means, for generating a PI signal;
summing means including a noninverting input port coupled to said control law processing means, and also including an inverting input port coupled to receive a magnetic torque signal representative of the commanded magnetic torque about said axis, for taking the difference between said PI signal and said commanded magnetic torque for generating said wheel torque command signal; and
wherein said torque command signal generator further includes means for generating said magnetic torque signal.

6. A system according to claim 1, wherein:
said speed sensing means further comprises:
momentum error signal generating means coupled for multiplying said speed signals by the inertia of said reaction wheel, whereby said speed signals represent momentum error;
said threshold comparison means compares said momentum-error representing speed signals with a momentum limit value for generating said comparison signals.

7. A system according to claim 1, wherein said threshold comparison means includes said limit value as a lower limit value, and includes an upper limit value at a magnitude of said speed signals greater than that of said lower limit values, and produces said comparison signals representing the state of said speed signals relative to said upper and lower limit values; and
said torquing command signal generating means includes means responsive to said comparison signals for generating said body torque command signal in a magnitude and polarity such as to increase said speed of said wheel when said speed signals are below said lower limit value, and such as to decrease said speed of said wheel when said speed signals are above said upper limit value.

8. A method for attitude control of a spacecraft about a spacecraft axis, comprising the steps of:
sensing the spacing attitude about said axis to generate an attitude signal;
processing said attitude signal to generate an error signal representative of the deviation of said spacecraft attitude form a desired attitude;
processing said error signal by a control law including at least proportional and integral components to produce a PI signal;
spinning a reaction wheel about an axis which is at least parallel to said spacecraft axis under the control of a wheel torque command signal;
translating said PI signal into said wheel torque command signal applied to said reaction wheel;
sensing the speed of said reaction wheel to produce a speed signal proportional to the speed of said reaction wheel;
comparing said speed signal with a threshold value of speed to produce a mode signal indicative of wheel speeds at least above and below said threshold value; and
generating, by means other than said wheel; a torque of said spacecraft about said spacecraft axis when said mode signal indicates that said wheel speed is below said threshold, said torque being of a polarity such that said reaction wheel velocity is increased.

9. A method according to claim 8, wherein said step of generating a torque comprises the step of generating said torque in proportion to the magnitude of said speed signal.

10. A method according to claim 8, wherein said step of sensing the speed includes the step of generating a signal representative of the angular velocity of said reaction wheel, and multiplying said signal representative of the angular velocity by a signal representing the inertia of said reaction wheel to generate said speed signal.

11. A method according to claim 8,
further comprising the step of generating an auxiliary signal representative of said torque of said spacecraft about said axis, as generated by said means other than said wheel; and wherein said translation step includes the step of:
subtracting said auxiliary torque signal from said PI signal to produce said wheel torque command signal.

12. A method according to claim 8, wherein said step of generating a torque by means other than said wheel includes the step of generating a magnetic torque.

13. A method according to claim 12, wherein said step of generating a magnetic torque includes the step of measuring the local geomagnetic field.

* * * * *